United States Patent Office 3,372,020
Patented Mar. 5, 1968

3,372,020
PROCESS FOR MAINTAINING THE GROWTH OF PLANTS
Joseph Regenstein, Jr., Chicago, Ill., assignor to Velsicol Chemical Corporation, Chicago, Ill., a corporation of Illinois
No Drawing. Continuation-in-part of application Ser. No. 343,224, Feb. 7, 1964. This application Nov. 7, 1966, Ser. No. 592,327
4 Claims. (Cl. 71—85)

ABSTRACT OF THE DISCLOSURE

A process for maintaining the growth of plants which comprises applying thereto a discontinuous film of thermoplastic, petroleum-derived, inelastic, nonrubbery hydrocarbon resin having a softening point of from about 50 to about 200° F., a mixed aniline point of from about 20 to about 80° C., an iodine number of from about 70 to about 300, and a molecular weight of from about 300 to about 1400 as determined by cryoscopic means, by applying to the said plants a predominantly aqueous, resin-in-water emulsion of said resin containing from about 1 to about 15% by weight of the resin in an amount leaving the said discontinuous film upon separation of the resin from the water.

---

This application is a continuation-in-part of my copending application Ser. No. 343,224, filed Feb. 7, 1964, which in turn is a continuation-in-part of my application copending therewith, Ser. No. 160,338, filed Dec. 8, 1961, both now abandoned.

This invention relates to a process for the control of the consumption and evaporation of water from growing plants. More particularly, this invention relates to a process for the control of the consumption and evaporation of water from growing plants which comprises applying thereto a predominantly aqueous, resin-in-water emulsion of a thermoplastic, petroleum-derived hydrocarbon resin and a diluent therefor.

It is known that water evaporates from plants through pore-like structures in their leaves and other above-surface parts. It is also known that some evaporation of water is necessary to control the temperature of the plant and to provide a water differential to transport life-sustaining materials through the plant. To maintain a favorable water balance in the plant, the loss of water from evaporation must not, except for very short periods, exceed the intake of water. If the evaporation of water from the leaves and other parts exceeds the intake for a long period, the plant wilts, resulting in retardation or inhibition of growth, and eventually death.

The above phenomenon has plauged civilization by causing a loss of food and forage crops during times of drought, often resulting in famine. The phenomenon has also hindered the economical cultivation of crops in areas of low rainfall and in semi-arid areas.

Heretofore it has been attempted to protect plants during transplanting, grafting, storage and similar operations by coating various plant surfaces with oils, waxes, and the like. These attempts generally failed, as the oils were often toxic to many varieties of plants and tended to flow off the plant; whereas the waxes, when applied hot, damaged the plants and when applied cold, often cracked and dropped from the plant. Attempts have also been made to protect the plants during these operations by coating the plant surfaces with films of natural or synthetic rubber compositions by dipping the plant into a rubber latex or other solution of rubber, or by spraying or brushing the latex or other composition onto the plant. Although the latter rubbery coatings protected the plant from insect and fungus pests and somewhat retarded the evaporation of moisture by providing a more or less impervious coating on the plant, the plants often perished in times of drought since the plants still consumed large amounts of water required to maintain its survival and growth.

Moreover, Austrian Patent No. 212,628 purports to coat a portion of the plants with polymers of the polyethylene and polyisobutylene type as well as polymers of the polyvinyl chloride, polyvinyl butyrals and cellulose types. These polymers are often detrimental to the plant, for various reasons, such as their high molecular weight, often 5,000 to 11,000.

Therefore, it is one object of the present invention to provide a process for the effective control of the consumption and evaporation of water of plants.

It is another object of the present invention to provide a process which will permit the growth and survival of plants during periods of reduced rainfall.

It is another object of the present invention to prevent the wilting of leaves of plants during periods of reduced rainfall.

Still another object of this invention is to permit the economical cultivation of crops in areas of low rainfall and in semi-arid areas.

These and other objects of the present invention will be apparent from the ensuing description.

The reduction of the evaporation of water by the process of the present invention results in a corresponding decrease in the consumption of water by the plant, and thus a favorable water balance is maintained with the consumption and evaporation of water being simultaneously controlled. Unlike the application of the heretofore known continuous or impervious coatings which eliminated evaporation, the process of the present invention controls the evaporation of water, but does not eliminate it, since as previously stated, some evaporation is desirable and necessary.

The process of the present invention comprises applying to the growing plants a predominantly aqueous, resin-in-water emulsion of a thermoplastic petroleum-derived, inelastic, nonrubbery hydrocarbon resin in an amount leaving a discontinuous film of said resin on the plant upon separation of the resin from the water. It is preferred to utilize a thermoplastic, petroleum-derived, inelastic, nonrubbery hydrocarbon resin having a softening point of from about 50° to about 200° F. (ball and ring method) and an average molecular weight below about 2,000, as the resin ingredient in the above-described liquid composition. It is more preferred to use a thermoplastic petroleum-derived, inelastic, nonrubbery hydrocarbon resin having a softening point of from about 50° to about 200° F., a mixed aniline point of from about 20° to about 80° C., and an Iodine number of from about 70 to about 300, and a molecular weight of from about 300 to about 1,400 as measured by cryoscopic means, as the resin ingredient. The resin utilized in the process of the present invention can be produced by thermal and/or catalytic polymerization of unsaturated petroleum fractions by methods and procedures common to the art.

It is even more preferred to use as the resin ingredient in the predominantly aqueous composition utilized in the process of the present invention, a thermoplastic, petroleum-derived, inelastic, nonrubbery hydrocarbon resin having a softening point of from about 50° to about 200° F., a mixed aniline point of from about 20° to about 80° C., an Iodine number of from about 70 to about 300, a saponification number of from 0 to about 2, a flash point (Cleveland Open Cup) above 350° F., an A.P.I. gravity at 60° F., of from 0 to about 20 degrees, a Gardner color (50% toluene) of from about 1 to about 12, and a molecular weight of from about 300 to about 1400 as measured by cryoscopic means.

An especially preferred resin ingredient of the composition used in the process of the present invention, hereinafter designated "Resin A," is a thermoplastic, petroleum-derived, inelastic, nonrubbery, substantially completely polymerized, aromatic, hydrocarbon resin produced by polymerization of unsaturated petroleum fractions, e.g. by polymerization of "dripolene," a commonly known mixture of unsaturated hydrocarbons obtained in the high temperature pyrolysis of normally gaseous hydrocarbons, said resin having a softening point of from about 100° to about 200° F., a mixed aniline point of from about 20° to about 60° C., an Iodine number of from about 70 to about 220, a saponification number of from 0 to about 2, a flash point (Cleveland Open Cup) above 425° F., an A.P.I. gravity at 60° F., of from 0 to about 10 degrees, a Gardner color (50% toluene) of from about 1 to about 12, and a molecular weight of from about 600 to about 1400 as measured by cryoscopic means. Hydrocarbon resins of the above description and having the properties defined herein can be readily prepared as described in United States Patent No. 2,798,866. This patent also defines the term "dripolene."

A second especially preferred resin ingredient, hereinafter designated "Resin B," is a thermoplastic, petroleum-derived, inelastic, nonrubbery hydrocarbon resin composed substantially of tetramers, pentamers, hexamers, heptamers, octamers, and higher polymers of conjugated aliphatic and cyclic dienes having less than 7 carbon atoms per diene monomer, and having a softening point of from about 50° to about 100° F., a mixed aniline point of from about 40° to about 80° C., an Iodine number of from about 200 to about 300, a saponification number of from 0 to about 2, a flash point (Cleveland Open Cup) about 350° F., an A.P.I. gravity at 60° F., of from 0 to about 20 degrees, a Gardner color (50% toluene) of from about 1 to about 12, and a molecular weight of from about 300 to about 600 as measured by cryoscopic means. Examples of conjugated aliphatic dienes suitable for use in preparing Resin B are: iso-prene, cis-piperylene, trans-piperylene, 1,3-hexadiene, and 2,4-hexadiene; while examples of suitable conjugated cyclic dienes are: cyclopentadiene, methylcyclopentadiene, and 1,3-cyclohexadiene.

A particulary preferred Resin B is the tetramer and higher polymer fraction which has an A.P.I. gravity of from about 5 to about 20 degrees, and which is produced from a liquid petroleum hydrocarbon stream composed substantially of dimers, trimers, codimers, and higher polymers of conjugated aliphatic and cyclic dienes having less than 6 carbon atoms per diene monomer molecule. The said liquid petroleum hydrocarbon stream can be fractionally distilled, preferably in vacuo, to recover the tetramer and higher polymer fraction (Resin B) as the residue. Increased yields of particularly preferred Resin B, having less unsaturation, can be obtained by heat treating the hydrocarbon stream at between 500° and 700° F., for up to 25 hours, and recovering the Resin B therefrom by removing monomers and low polymer fractions by distillation.

The thermoplastic petroleum-derived, hydrocarbon resin is utilized in a predominantly aqueous composition in the process of the present invention. Since the resin heretofore described is insoluble, it is necessary to emulsify the resin to form an emulsion with the water. Either water-in-resin or resin-in-water emulsions can be used.

A typical resin-in-water emulsion composition useful in the process of the present invention can be readily prepared by heating the resin until almost molten, adding emulsifiers, and, if desired, wetting agents, and mixing with water until an emulsion is formed. At first a water-in-resin emulsion is formed, which can be slowly mixed through an inversion period to yield a concentrated resin-in-water emulsion which can be further diluted to any desired concentration. The temperature at which the emulsion is prepared is dependent upon the softening point of the resin and will usually correspond thereto.

The emulsifiers and wetting agents useful with the resin described herein to prepare the compositions utilized in the process of the present invention are surface-active materials of the anionic or nonionic types. Preferably a combination of the two types is used to obtain rapid emulsions of excellent stability. Typical examples of such surface-active materials are sodium stearate, potassium laurate, morpholine oleate, sodium lauryl sulfate, sodium 2-ethylhexyl sulfate, sodium 2-ethylhexanol-1-sulfate, sodium 7 - ethyl-2-methylundecanol-4-sulfate, sodium naphthalenesulfonate, sodium alkylnaphthalenesulfonate, sodium oleic acid sulfonate, sodium castor oil sulfonate, glycerol monostearate containing a soap (or a sodium fatty alcohol sulfate), polyoxyethylene fatty alcohol ethers, polyglycol fatty acid esters, polyoxyethylene modified fatty acid esters, polyoxyethylenepolyol fatty acid esters, polyoxypropylene fatty alcohol ethers, polypropylene glycol fatty acid esters, polyoxypropylene modified fatty acid esters, polyoxypropylenepolyol fatty acid esters, polyol fatty acid monoesters, lecithin, di- and higher polyhydric alcohol fatty acid esters, cholesterol and other fatty acid esters, lanolin, oxidized fatty oils, alkylated aryl polyether alcohols such as the condensation product of diamylphenol with ethylene oxide, and the like. Mixtures of such materials can also be used to combine or modify properties.

The predominantly aqueous compositions utilized in the process of the present invention can be sprayed onto the plants to be treated, which is the preferred method of application, or the said plants can be dipped therein. The latter method of application is useful when treating potted plants or plants being transferred or transported. When the compositions are used as sprays, it is preferred to dilute the emulsion composition with water to obtain a composition containing from about 1 to about 15% resin by weight. This concentration affords a coating which permits minimum consumption and evaporation of water with maximum plant growth.

Compositions containing less than about 1% resin are oftentimes undesirable, since the coating resulting therefrom may be washed off the plant during spraying or dipping by the action of the excess diluent. On the other hand, compositions containing increased quantities of resin, greater than about 15%, while useful in the treatment of large plants, such as shrubs, may form a coating which coagulates into a continuous coating, thus suffocating the smaller plants.

It is particularly convenient to form concentrated emulsions with a minimum quantity of water and to dilute these liquid concentrates in the field prior to spraying. A typical concentrate may have a viscosity from about 40 to about 75 Krebs units and contains up to 65–70% resin.

In applying the predominantly aqueous compositions utilized herein, consideration must be given to the nature, stage of growth, and size of the crop, the estimated supply of water, weather conditions at the time of application and following, environmental factors influencing the rate and vigor of growth, and the length of time the consumption and evaporation of water is to be controlled. These and other factors will determine the effective amount to be applied to a given area for control. Generally, effective control can be obtained with an application of less than one gallon of dilute predominantly aqueous composition for about 25 relatively mature grain crop plants, such as corn plants approximately 5½ feet high. Of course, smaller or younger plants having less foliage will require less composition per plant for effective treatment.

The preparation of the predominantly aqueous compositions utilized by the process of the present invention and their application will be more clearly understood

Example 1.—Preparation of an emulsion concentrate of resin A

Resin A (578.5 gm.), which was a thermoplastic, petroleum-derived, inelastic, nonrubbery substantially completely polymerized, aromatic, hydrocarbon resin having a softening point of 140°–150° F., a mixed aniline point of 32°–36° C., an Iodine number of 145–155, a saponification number of 0–2, a flash point (Cleveland Open Cup) above 425° F., an A.P.I. gravity at 60° F. of 0–4.5 degrees, a Gardner color (50% toluene) of 5–10, and a molecular weight of about 1000 as measured by cryoscopic means, was heated at about 190° F. until the resin was almost molten. A nonionic surfactant of the octyl phenoxy polyoxyethylene ethanol type (30.4 gm.) and the sodium salt of an alkyl aryl polyether sulfonate (14.7 gm.) were mixed into the almost molten resin until a uniform mixture was formed. Water (500 gm.) was slowly added at the temperature of the mixture with agitation by means of a paddle stirrer driven at a maximum speed of 875 revolutions per minute. At first a water-in-resin emulsion was formed, but on continued stirring with continuous addition of water the emulsion inverted to a resin-in-water emulsion as indicated by the change from a doughy consistency to a uniform milky consistency. After all of the water had been added the emulsion concentrate thus formed had a viscosity of 51 Krebs units, a solids content of 57.1% by weight, a pH of 8.2, and a density of 8.47 pounds per gallon. The resin employed in this example can be prepared as described in United States Patent No. 2,798,866.

Example 2.—Preparation of resin B

A hydrocarbon-bottoms stream composed substantially of dimers, trimers, codimers, cotrimers and higher polymers of conjugated aliphatic and cyclic dienes, and having the following physical properties: A.P.I. gravity at 60° F., 26 degrees, Gardner color, 3; viscosity (S.S.U. at 100° F.), 43 sec.; flash point (Cleveland Open Cup) 135–138° F.; Iodine number, 326; and aniline point, 34.2° C.; was heated at 590–595° F., for 4 hours. Dimers, trimers, codimers, and cotrimers were distilled off by heating to a pot temperature of 575° F. at 10 mm. mercury pressure, to yield Resin B as the inelastic, nonrubbery residue, having a softening point of 74° F., a mixed aniline point of 69.4° C., an Iodine number of 276, a saponification number of 0–2, a flash point (Cleveland Open Cup) of 375° F., a Gardner color (50% toluene) of 6–7, and a molecular weight of 200–600 as determined by cryoscopic means.

Example 3.—Preparation of an emulsion concentrate of resin B

Resin B (578.5 gm.) prepared as in Example 2, was heated to 120°–140° F. A nonionic surfactant, nonyl phenoxy polyoxyethylene ethanol (43.1 gm.), and the sodium salt of an alkyl aryl polyether sulfonate (14.7 gm.) were mixed into the almost molten resin until a uniform mixture was obtained. Water (500 gm.) was slowly added at 120–140° F. with agitation provided by a paddle stirrer driven at a maximum speed of 875 revolutions per minute. A water-in-resin emulsion was first formed which inverted to a resin-in-water emulsion as indicated by the change from doughy to milky consistency. After all of the water had been added the emulsion concentrate thus formed had a viscosity of 47 Krebs units, a solids content of 53.6% by weight, and a pH of 7.6.

The effectiveness of the process of the present invention in controlling the consumption and evaporation of water from plants can be demonstrated by greenhouse experiments on potted plants, such as corn, bean, tomato, and the like.

The plants are grown in individual pots in the greenhouse and are sealed into the pots at earth level with a non-phytotoxic clay prior to maturity. The plants are then sprayed with the desired concentration of an emulsion of the material to be tested. The plants are watered through a tube inserted through the seal, to a level mark at daily intervals and observed for response to treatment, the amount of water added being recorded as a measurement of the amount of water used and evaporated from the plant during the previous day.

In actual experiments, carried out as described above, on corn plants, approximately 5½ feet high immediately prior to tasseling, plants treated with an emulsion prepared as described in Example 3 containing 10% product of Example 2, showed a high order of reduction in the amount of water consumed and evaporated as compared to untreated plants and plants treated with rubber latex ("Vulcanol" supplied by the Alco Oil and Chemical Corp., U.S.A.) as shown in the table below. Furthermore, under extreme conditions, e.g., temperatures of from as low as 65° F. to as high as 117° F. and average humidities from 10% to 80%, the treated plants survived and later tasseled normally, while untreated plants wilted and died.

RESULTS OF EXPERIMENT

| Emulsion Concentrate | Amount of dilute solution remaining on plant after application of 150 ml. of dilute solution, ml. | Average daily water consumption, ml. |
| --- | --- | --- |
| Product of Example 3 | 40 | 228 |
| Rubber latex | 30 | 425 |
| Water (Control) |  | (¹) |

¹ Plants dead.

As demonstrated in the above experiment, the method of the present invention provides an unexpected and surprising reduction in the amount of water consumed by the treated plant. Thus the amount of water consumed by the treated corn plants in the above experiment was almost half of the amount consumed by the plant treated with rubber latex, under conditions which caused untreated plants to wilt and die.

I claim:
1. A process for maintaining the growth of plants and controlling the consumption and evaporation of water which comprises applying thereto a discontinuous film of thermoplastic, petroleum-derived, inelastic, nonrubbery hydrocarbon resin having a softening point of from about 50 to about 200° F., a mixed aniline point of from about 20 to about 80° C., an iodine number of from about 70 to about 300, and a molecular weight of from about 300 to about 1400 as determined by cryoscopic means, by applying to the said plants a predominantly aqueous, resin-in-water emulsion of said resin containing from about 1 to about 15% by weight of the resin in an amount leaving the said discontinuous film upon separation of the resin from the water.

2. The process of claim 1, wherein the resin has a saponification number of from 0 to about 2, a flash point (Cleveland Open Cup) above 350° F., an A.P.I. gravity at 60° F. of from 0 to about 20 degrees, and a Gardner color (50% toluene) of from 1 to about 12.

3. The process of claim 1, wherein the resin has a softening point of from about 50° to about 100° F., a mixed aniline point of from about 40° to about 80° C., an iodine number of from about 200 to about 300, a saponification number of from 0 to about 2, a flash point (Cleveland Open Cup) above 350° F., an A.P.I. gravity at 60° F. of from 0 to about 20 degrees, a Gardner color (50% toluene) of from about 1 to about 12, and a molecular weight of from about 300 to about 600 as measured by cryoscopic means.

4. The process of claim 1, wherein the resin is aromatic and substantially completely polymerized, and has a softening point of from about 100 to about 200 F., a mixed aniline point of from about 20 to about 60° C., an iodine number of from about 70 to about 220, a saponification number of from 0 to about 2, a flash point (Cleveland Open Cup) about 425° F., an A.P.I. gravity at 60° F. of from 0 to about 10 degrees, a Gardner color (50% toluene) of from about 1 to about 12, and a molecular weight of from about 600 to about 1400 as measured by cryoscopic means.

References Cited

FOREIGN PATENTS 212,628  12/1960  Austria.

JAMES O. THOMAS, JR., *Primary Examiner.*